US010992599B2

United States Patent
Cho

(10) Patent No.: US 10,992,599 B2
(45) Date of Patent: Apr. 27, 2021

(54) COMMUNICATION METHOD OF ETHERNET NETWORK FOR VEHICLE

(71) Applicants: Hyundai Motor Company, Seoul (KR); Kia Motors Corporation, Seoul (KR)

(72) Inventor: Yong Woon Cho, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 12 days.

(21) Appl. No.: 16/661,102

(22) Filed: Oct. 23, 2019

(65) Prior Publication Data

US 2020/0396180 A1 Dec. 17, 2020

(30) Foreign Application Priority Data

Jun. 17, 2019 (KR) .......................... 10-2019-0071245

(51) Int. Cl.
| | |
|---|---|
| *H04L 12/28* | (2006.01) |
| *H04L 12/931* | (2013.01) |
| *H04L 12/46* | (2006.01) |
| *G06F 9/50* | (2006.01) |
| *H04L 29/12* | (2006.01) |
| *H04L 29/08* | (2006.01) |
| *H04L 12/18* | (2006.01) |

(52) U.S. Cl.
CPC .......... *H04L 49/351* (2013.01); *G06F 9/5083* (2013.01); *H04L 12/18* (2013.01); *H04L 12/4641* (2013.01); *H04L 61/2069* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 2019/0052481 A1* | 2/2019 | Wu ...................... | H04L 12/1881 |
| 2019/0356608 A1* | 11/2019 | Tanaka .................. | H04W 24/04 |
| 2020/0207293 A1* | 7/2020 | Park ........................ | H04W 4/48 |
| 2020/0389469 A1* | 12/2020 | Litichever ............... | H04W 4/40 |

FOREIGN PATENT DOCUMENTS

| | | | |
|---|---|---|---|
| KR | 20180072339 A | * | 6/2018 |
| KR | 10-2179443 B1 | * | 12/2018 |

* cited by examiner

*Primary Examiner* — Phyllis A Book
(74) *Attorney, Agent, or Firm* — Brinks Gilson & Lione

(57) ABSTRACT

In a communication method of an Ethernet network for a vehicle, a load of a CPU in a reception ECU is reduced by enabling the reception ECU receiving an Ethernet message to receive the message with a changed period. For this, each time a message is transmitted from a transmission ECU to an Ethernet switch, the message is transmitted with a changed period by the Ethernet switch selectively only to a reception ECU determined on the basis of setting information and information included in the transmitted message, thereby controlling a message reception period for each reception ECU.

11 Claims, 3 Drawing Sheets

COMMUNICATION METHOD OF ETHERNET NETWORK FOR VEHICLE

CROSS REFERENCE TO RELATED APPLICATION

The present application claims priority to Korean Patent Application No. 10-2019-0071245, filed Jun. 17, 2019, the entire contents of which is incorporated herein for all purposes by reference.

BACKGROUND

Field

The present disclosure relates to a communication method of an Ethernet network for a vehicle.

Description of the Related Art

As digitization of components of a vehicle rapidly proceeds, types and the number of electronic devices equipped in a vehicle are greatly increased.

For example, in a vehicle, an electronic device is used in a powertrain control system, a body control system, a chassis control system, a vehicle network, a multimedia system, and the like.

Here, the powertrain control system means an engine control system, a transmission control system, and the like.

Further, the body control system means a body electronic component control system, a comfort device control system, a lamp control system, and the like. The chassis control system means a steering-system control system, a brake control system, a suspension control system, and the like.

The multimedia system means a navigation device system, a telematics system, an infotainment system, and the like.

These systems and the electronic devices constituting each of the systems are connected over a vehicle network, and a vehicle network capable of supporting a function of each of the electronic devices is required.

The disclosure of this section is to provide background of the invention. Applicant notes that this section may contain information available before this application. However, by providing this section, Applicant does not admit that any information contained in this section constitutes prior art.

SUMMARY

Aspects of the invention provide a communication method of an Ethernet network for a vehicle, wherein a load of a CPU in a reception electronic control unit (ECU) is reduced by enabling the reception ECU receiving an Ethernet message to receive the message with a changed period. Aspects of the invention also provide a communication method of an Ethernet network for a vehicle, wherein a reception electronic control unit (ECU) receiving an Ethernet message changes a message reception period, such that a load of a CPU within the reception ECU is reduced.

According to an embodiment of the present invention, there is provided a communication method of an Ethernet network for a vehicle, the communication method including: setting, in an Ethernet switch transmitting (forwarding) an Ethernet message from a transmission ECU to a reception ECU, setting information for controlling a message reception period for each Ethernet ECU; periodically transmitting, from the transmission ECU among Ethernet ECUs connected to the Ethernet switch, the messages to the Ethernet switch; determining, on the basis of the setting information and information included in the message, the reception ECU to which the message is transmitted, among the Ethernet ECUs connected to the Ethernet switch; and operating, by the Ethernet switch, to transmit the message transmitted from the transmission ECU, to the determined reception ECU, wherein each time the message is transmitted from the transmission ECU to the Ethernet switch, the message is transmitted by the Ethernet switch selectively only to the reception ECU determined on the basis of the setting information and the information included in the transmitted message, thereby controlling the message reception period for each reception ECU.

In the foregoing communication method of the Ethernet network for the vehicle, the Ethernet switch operates to determine, on the basis of setting information and information contained in a received message, the reception ECU receiving the message, and to selectively transmit the message only to the determined reception ECU, whereby the message reception period for each reception ECU is controlled.

As a result, in the communication method of the Ethernet network for the vehicle according to embodiments of the present invention, it is possible that the message reception period of the reception ECU is changed into an appropriate period and the load of the CPU in the reception is reduced.

BRIEF DESCRIPTION OF THE DRAWINGS

The above and other aspects, features and other advantages of the present invention will be more clearly understood from the following detailed description when taken in conjunction with the accompanying drawings, in which.

DETAILED DESCRIPTION OF EMBODIMENTS

Figure 1:
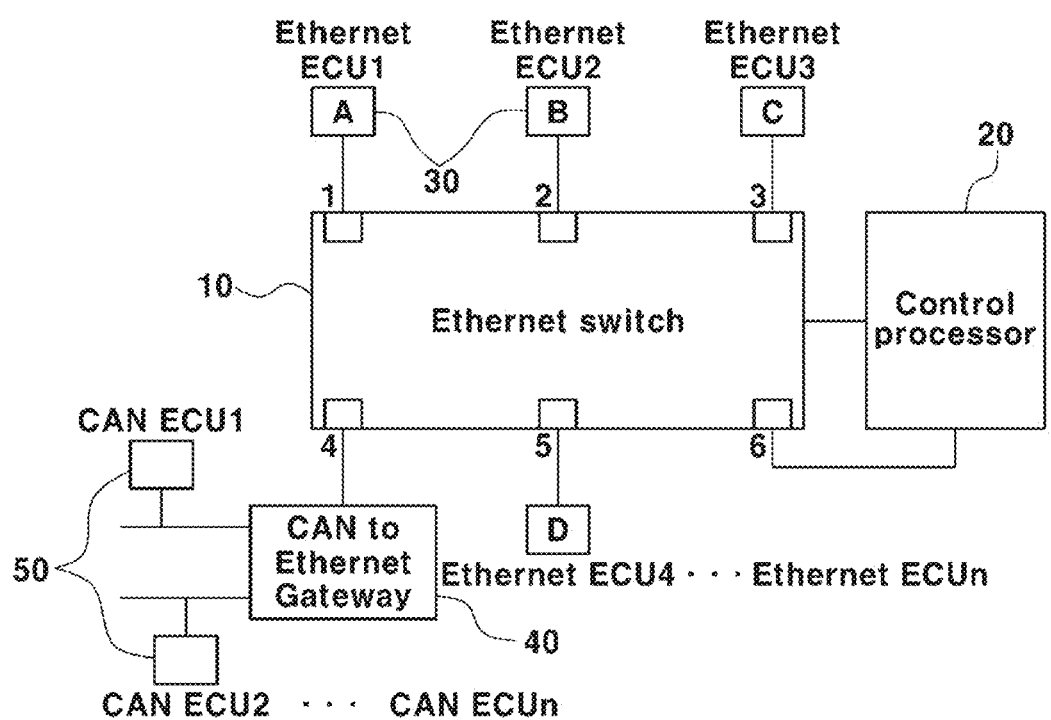
FIG. 1 is a diagram illustrating a configuration of a network system of a vehicle capable of performing a communication process according to embodiments of the present invention.

Hereinbelow, embodiments of the present invention will be described in detail with reference to the accompanying drawings such that the present invention can be easily embodied by those skilled in the art to which this present invention belongs. However, the present invention is not limited to an embodiment described herein and may be embodied in various forms.

Throughout the specification, when a part "includes" an element, it is noted that it further includes other elements, but does not exclude other elements, unless specifically stated otherwise.

As vehicle networks, a controller area network (CAN), a FlexRay-based network, a Media Oriented System Transport (MOST)-based network, and the like may be used.

The CAN supports the maximum transmission rate of 1 Mbps and supports automatic retransmission of a frame subjected to collision, cyclic redundancy check (CRC)-based error detection, and the like.

The FlexRay-based network supports the maximum transmission rate of 10 Mbps and supports simultaneously transmission of data through two channels, synchronous data transmission, and so on.

The MOST-based network is a communication network for high-quality multimedia and supports the maximum transmission rate of 150 Mbps.

In the meantime, the telematics system, the infotainment system, the enhanced safety system, and the like of the vehicle require high transmission rate, system scalability, and the like, but the existing CAN or FlexRay-based network, and the like do not adequately support the systems.

The MOST-based network supports higher transmission rate than the CAN and the FlexRay-based network. However, it is costly to apply the MOST-based network to all the networks for the vehicle. Thus, an Ethernet-based network is being considered as a vehicle network.

The Ethernet-based network supports bi-directional communication through a pair of windings and also high transmission rate. Thus, the Ethernet communication capable of supporting high rate and large capacity may be applied to the existing in-vehicle network composed of the CAN.

The Ethernet-based network includes multiple communication nodes (for example, electronic devices, switches, and the like) that perform Ethernet-based communication.

Particularly, in order to implement a connectivity function in a vehicle, an autonomous driving function, and the like, an electronic device using high rate and a large amount of data, for example, numerous electronic control units (ECUs) for controlling each system, have been introduced to the in-vehicle network.

Further, in a structure where the in-vehicle communication network has a CAN electronic control unit (CAN ECU) performing the CAN communication and an Ethernet ECU performing the new Ethernet communication together, a gateway performs transformation (routing) between different types of communications.

For example, a CAN message of the CAN ECU is transformed into an Ethernet message through the gateway and then is transmitted to a particular Ethernet electronic control unit (Ethernet ECU) via an Ethernet switch.

Here, the Ethernet ECU (transmission ECU) that has received the CAN message transmits the message to another Ethernet ECU (reception ECU) via an Ethernet switch and transmits periodic messages in Ethernet data frames.

The transmission period of the message transmitted from the CAN to the Ethernet network is very short, for example, several tens msec. Transmission and reception of messages between Ethernet ECUs may be performed without change in the period.

Each of many ECUs in a vehicle performs its own function based on information (message) of other ECUs through communication. In the process thereof, the Ethernet ECUs need to efficiently receive and process all the periodic Ethernet data frames that are transmitted thereto.

In the above instances, the communication is performed in such a manner that in a condition where the transmission period of the Ethernet ECU transmitting the message is determined, the Ethernet ECU receiving the message receives and processes all the periodic Ethernet data frames (messages) using the transmission period of the transmission ECU as it is, namely, without changing the transmission period.

Thus, during the process of receiving and processing the message, it is expected that the load of a central processing unit (CPU) or a micro control unit (MCU) increases in the reception ECU, which may requires a high-end CPU or MCU.

In the following description, an electronic control unit (ECU) periodically transmitting a message is referred to as a "transmission ECU" and conversely, an electronic control unit receiving a message is referred to as a "reception ECU".

Further, in the following description, a period in which an arbitrary ECU transmits a message is referred to as a "transmission period" and conversely, a period in which an arbitrary ECU receives a message is referred to as a "reception period".

Further, an Ethernet message is transmitted and received in a determined data frame format, so that in the following description, an Ethernet message and an Ethernet data frame are interpreted as having the same meaning.

In embodiments of the present invention, it is possible to avoid use of a high-end CPU (or MCU) in the Ethernet ECU. In one embodiment, reception period is extended to a period that the reception ECU requires, namely, a period in which implementation of a communication-based function is smoothly achieved in the reception ECU, to be longer than a transmission period of the transmission ECU, and the message is received and processed, thereby reducing the frequency of message reception and processing in the reception ECU. In embodiments of the present invention, a control processor sets and changes the reception period in which each reception ECU receives a message. The control processor changes the reception period considering the specification for each reception ECU (for example, the CPU specification), the load rate, or the like, and sets and changes setting information, described later, for setting and changing the reception period.

Here, in order to avoid unnecessary use of the high-end CPU or MCU of the Ethernet ECU, the reception period of the reception ECU is extended to an appropriate reception period that each Ethernet ECU requires, namely, a period in which implementation of the communication-based function is smoothly achieved, to be longer than the transmission period of the transmission ECU, thereby reducing the frequency of message reception and processing.

Further, in order to set and change the reception period for each reception ECU, the control processor receives the message from the transmission ECU through the Ethernet switch first, and the control processor sets, on the basis of the received message, the setting information for determining the communication path in the Ethernet switch, such that the message is transmitted only to the selected reception ECU.

Describing in detail, by the control processor controlling the operation of the entire Ethernet communication network, more specifically, the operation of the Ethernet switch, the setting information for controlling the message reception period for each ECU is set and stored in the Ethernet switch.

In embodiments of the present invention, the Ethernet switch is configured to determine an ECU among all the Ethernet ECUs which receives the message on the basis of the setting information, and operates to selectively transmit the message only to the determined ECU.

In embodiments of the present invention, the Ethernet switch is configured to determine, on the basis of the setting information and information contained in the Ethernet message, the reception ECU for the message.

In embodiments, the setting information within the Ethernet switch defines the communication path through which the Ethernet message is transmitted, specifically, an address and a path to receive the Ethernet messages periodically transmitted by the transmission ECU.

Here, the Ethernet switch matches the setting information with the information contained in the Ethernet message and determines the Ethernet ECU (reception ECU) to which the message is transmitted.

Accordingly, even though the transmission ECU transmits Ethernet messages with a regular period, the Ethernet switch transmits the Ethernet messages through the communication path defined in the setting information with respect to the current message, so that the Ethernet messages are transmitted only to the selected reception ECU. Thus, the messages are received for each reception ECU with the period equal to or different from the transmission period.

As described above, when the Ethernet messages are transmitted periodically, at each point in time when the Ethernet message is transmitted, the message is transmitted only to the selected reception ECU through the communication path determined on the basis of the setting information and the information in the message. Thus, the reception period for each reception ECU is determined and changed to be equal to or different from the transmission period for the transmission ECU.

In embodiments, the communication path inside the Ethernet switch and the reception period of the reception ECU are determined depending on the setting information, so that even though the transmission ECU transmits the Ethernet messages (namely, the Ethernet data frames corresponding to the messages) periodically based on a regular transmission period, the Ethernet messages are received only by the reception ECU that corresponds to the address and the path determined on the basis of the setting information in the Ethernet switch. Therefore, in the reception ECU, the message reception period is changed depending on the setting information.

Particularly, even though the transmission ECU transmits the Ethernet message with a regular and short period, the reception ECU receives the Ethernet message only at a point in time selected on the basis of the setting information. Therefore, the reception period of the reception ECU may be longer than the transmission period of the transmission ECU.

As described above, in receiving the Ethernet messages via the Ethernet switch with the required reception period, at least a part of all the Ethernet ECUs selectively receives the Ethernet messages assigned to an address based on the setting information, so that the Ethernet messages are received with the reception period longer than the transmission period.

By applying this method according to embodiments, it is possible to avoid or minimize use a high-end CPU or MCU in Ethernet ECUs.

Hereinafter, embodiments of the present invention will be described in detail with reference to the accompanying drawings.

FIG. 1 is a diagram illustrating a network system of a vehicle capable of performing a communication process according to embodiments of the present invention. As shown in the figure, the network system of the vehicle includes an Ethernet switch 10, a control processor 20, multiple Ethernet ECUs 30, a gateway 40, and a CAN ECU 50.

In the illustrative network system of the vehicle, the CAN message of the CAN ECU 50 is transformed into an Ethernet message through the gateway 40 and then the Ethernet message is transmitted to a particular Ethernet ECU 30 ("A" in FIG. 1) via the Ethernet switch 10.

Here, the Ethernet ECU (transmission ECU) A that has received the message transmits the message to other Ethernet ECUs (reception ECUs) ("B", "C", and "D" in FIG. 1) via the Ethernet switch 10, and transmits periodic messages in the Ethernet data frames.

The transmission period of the message transmitted from the CAN to the Ethernet network is very short as several tens msec. In some instances of Ethernet network communication, transmission and reception of messages between Ethernet ECUs are performed without change in the period. However, in embodiments of the present invention, the message reception period is changed into an appropriate period required for each reception ECU.

At least one or two or more Ethernet ECUs among the multiple Ethernet ECUs 30 are the transmission ECUs, and at least one or two or more Ethernet ECUs among the Ethernet ECUs except for the transmission ECUs are the reception ECUs.

In the network system of the vehicle, each Ethernet ECU 30 is configured to periodically or non-periodically transmit and receive Ethernet packets via an Ethernet interface.

As described above, in the vehicle, the Ethernet ECUs 30 are connected to transmit and receive a message by Ethernet communication, whereby an Ethernet network system is configured.

In the network system of the vehicle, the Ethernet switch 10 operates in such a manner as to selectively connect and control the Ethernet communication paths between the Ethernet ECUs 30. The control processor 20 is connected to the Ethernet switch 10 via the Ethernet interface and controls the overall operation of the Ethernet switch.

Further, the control processor 20 transmits and receives an Ethernet packet via the Ethernet interface, changes the settings of the Ethernet switch 10 via another interface, and is configured to monitor the communication state of the Ethernet network system.

The gateway 40 transforms the communication or message type between the CAN and the Ethernet.

In embodiments, the gateway 40 is a component for transforming (routing) the message between the CAN system and the Ethernet network system and transmitting and receiving the message that results from the transformation. The gateway 40 transforms the CAN message to the Ethernet message for transmission to the Ethernet network system, or receives the Ethernet message from the Ethernet network system for transmission to a CAN bus.

To this end, in one embodiment, the gateway 40 is connected to the Ethernet switch 10 via the Ethernet interface.

In the network system of the vehicle, the CAN ECU 50 periodically transmits and receives the CAN messages via the CAN interface, and is unable to directly communicate with the Ethernet ECU 30.

Figure 2:
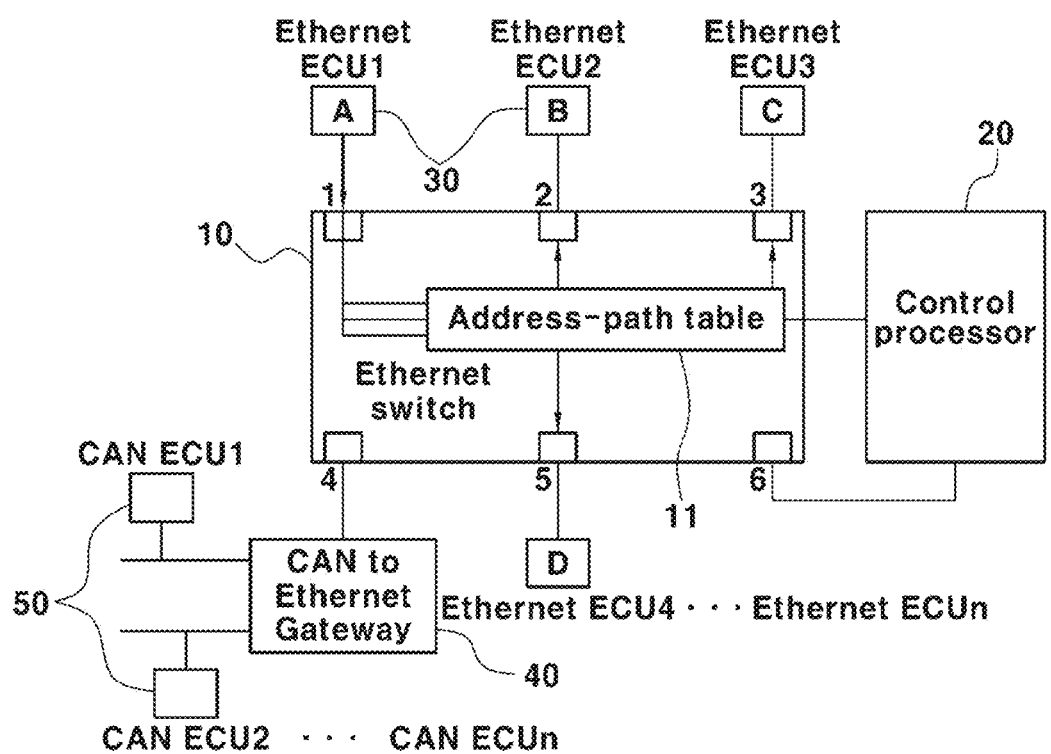
FIG. 2 is a diagram illustrating that an address-path table within an Ethernet switch is set by a control processor, in a network system of a vehicle performing a communication process according to embodiments of the present invention.

FIG. 2 is a diagram illustrating a configuration of a network system of a vehicle performing a communication process according to embodiments of the present invention, in which setting information in the Ethernet switch 10 is set by the control processor 20.

In embodiments of the present invention, the communication path inside the Ethernet switch 10 is determined by the setting information, and the setting information is set by the control processor 20 and is an address-path table 11, as shown in FIG. 2, which defines an address and a path to which the Ethernet message is transmitted.

Accordingly, after the setting information in the Ethernet switch 10 is set by the control processor 20, the Ethernet switch 10 transmits the Ethernet messages transmitted by the transmission ECU A to the reception ECUs B, C, and D selected on the basis of the setting information.

In the embodiment of the present invention, the address-path table 11 is table information in which a multicast address and a VLAN ID are assigned and specified for each port of the Ethernet switch 10 or for each Ethernet ECU 30 in such a manner that the desired reception period for each Ethernet ECU is determined.

Here, the multicast address defines a multicast group that receives the corresponding Ethernet message, and is a MAC address at which the corresponding Ethernet messages are received, wherein the MAC address is predetermined for each Ethernet ECU 30.

Further, in the setting information in the Ethernet switch 10, the VLAN ID is an ID specified for each port (the reference numerals "2", "3", and "5" in FIGS. 1 and 2) of the Ethernet switch to which the Ethernet ECU 30 is connected, namely, an ID specified to distinguish the port to which the message is transmitted.

Alternatively, in the setting information in the Ethernet switch 10, the VLAN ID is an ID specified for each Ethernet ECU 30 connected to each port 2, 3, or 5 of the Ethernet switch. Here, the VLAN ID is set and distinguished depending on the desired reception period for each Ethernet ECU 30.

In embodiments of the present invention, by the setting information in the Ethernet switch 10, the reception ECUs B, C, and D corresponding to the VLAN IDs in the data frames of the messages are determined. Here, the Ethernet switch operates to selectively transmit the message of the transmission ECU only to the determined reception ECUs.

As described above, with reference to the VLAN ID in the Ethernet data frame, only the reception ECUs that are assigned the same VLAN ID in the setting information are selected and the messages are transmitted thereto, such that the message reception period is determined for each reception ECU.

Further, in embodiments of the present invention, the data frame of the Ethernet message that the transmission ECU A transmits, namely, the Ethernet data frame, includes the MAC address and the VLAN ID.

Furthermore, when the Ethernet switch 10 receives the Ethernet messages from the transmission ECU A, the Ethernet switch 10 selects the reception ECUs B, C, and D that need to receive the messages, on the basis of the MAC address and the VLAN ID included in the Ethernet data frame of the message.

Next, the Ethernet switch 10 operates to transmit the Ethernet messages only to the selected reception ECUs.

In embodiments of the present invention, in the Ethernet data frame that the transmission ECU A transmits, the multicast address (MAC address) indicates a multicast group to which the Ethernet messages are desired to be transmitted, namely, an ECU group to which the messages are desired to be transmitted. The multicast address is used to select and determine the ECU group to which the Ethernet switch 10 transmits the Ethernet messages.

Further, in embodiments of the present invention, the VLAN IDs in the Ethernet data frames specify the reception ECUs B, C, and D from the selected ECU group, which receive the messages. In the Ethernet switch 10, by the VLAN IDs in the Ethernet data frames, at least several ECUs of the ECU group are selected as the reception ECUs for the messages.

Further, since the message is transmitted only to the selected reception ECU, the reception period of the reception ECU is determined depending on the VLAN ID included in the Ethernet data frame.

Further, in embodiments of the present invention, a single or multiple VLAN IDs are assigned and specified in the setting information for each Ethernet ECU 30 connected to the Ethernet switch 10. Alternatively, a single or multiple VLAN IDs are assigned and specified in the setting information for each port 2, 3, or 5 of the Ethernet switch 10.

Further, in the setting information, at least one VLAN ID assigned and specified to an arbitrary Ethernet ECU (reception ECU) is the same as the VLAN ID assigned and specified to another Ethernet ECU (reception ECU).

Alternatively, in the setting information, at least one VLAN ID assigned and specified to an arbitrary port 2, 3, or 5 is the same as the VLAN ID assigned and specified to another port.

Further, in embodiments of the present invention, the transmission ECU periodically outputs and transmits the messages to the Ethernet switch 10 which are generated by setting the VLAN IDs in the information contained in the respective messages in a predetermined order.

Hereinafter, a detailed example of the communication method for the Ethernet network according to embodiments of the present invention will be described.

First, in the configuration of the vehicle network shown in FIG. 2, it is assumed that the letters A ("Ethernet ECU1"), B ("Ethernet ECU2"), C ("Ethernet ECU3"), and D ("Ethernet ECU4") denote Ethernet ECUs ("Ethernet ECUn"); these Ethernet ECUs A, B, C, and D have the same multicast address; the Ethernet ECU A is the transmission ECU transmitting the messages with a periodicity of 10 msec; and the Ethernet ECUs B, C, and D are the reception ECUs receiving the messages.

Further, as shown in FIG. 2, the Ethernet ECU B is connected to the reception port 2 of the Ethernet switch 10, the Ethernet ECU C is connected to the reception port 3, and the Ethernet ECU D is connected to the reception port 5.

In embodiments, in the setting information of the Ethernet switch 10, the multicast address (MAC address) and the VLAN ID are assigned and specified depending on the desired reception period for each ECU, and the data frame of the Ethernet message that the transmission ECU A among the Ethernet ECUs 30 transmits, namely, the Ethernet data frame, includes the multicast address to which the message is required to be transmitted and VLAN ID information.

Here, in the Ethernet data frame of the message that the transmission ECU A transmits, the multicast address is set as a reception address at which the message is received, namely, the multicast address in which the reception ECUs B, C, and D that need to receive the messages is a reception group.

Further, in the Ethernet data frames of the messages that the transmission ECU A transmits with the regular period (for example, 10 msec), the VLAN IDs are set into "n", "n+1", "n", and "n+2" repeatedly in an order that the messages are transmitted.

Further, in the setting information in the Ethernet switch 10, the reception ECUs B, C, and D among all the Ethernet ECUs 30 are set to have the same multicast address. Here, a VLAN ID corresponding to the desired reception period that results from the change to receive the messages, is specified and assigned for each ECU.

For example, as the multicast address in the setting information in the Ethernet switch 10, the same address "X" is assigned and set to the reception ECUs B, C, and D.

In one implementation, when the reception ECU B desires to receive the messages with a periodicity of 10 msec; the reception ECU C desires to receive the messages with a periodicity of 20 msec; and the reception ECU D desires to receive the messages with a periodicity of 40 msec, in the setting information in the Ethernet switch 10, the VLAN IDs "n", "n+1", and "n+2" are assigned to the Ethernet ECU B; the VLAN IDs "n+1" and "n+2" are assigned to the Ethernet ECU C; and the VLAN ID "n+2" is assigned to the Ethernet ECU D in such a manner as to achieve reception of the messages with the desired reception period for each of the reception ECUs B, C, and D.

Accordingly, when in the Ethernet data frames of the messages that the transmission ECU A transmits, the multicast address is "X" and the VLAN ID is "n", the Ethernet switch 10 transmits the messages to the reception port 2 so that only the reception ECU B receives the messages.

Further, when in the Ethernet data frames of the messages that the transmission ECU A transmits, the multicast address is "X" and the VLAN ID is "n+1", the Ethernet switch 10 transmits the messages to the reception ports 2 and 3 so that only the reception ECUs B and C receive the messages.

Similarly, when in the Ethernet data frames of the messages that the transmission ECU A transmits, the multicast address is "X" and the VLAN ID is "n+2", the Ethernet switch 10 transmits the messages to the reception ports 2, 3, and 5 so that all the reception ECUs B, C, and D receive the messages.

As a result, the reception ECU B receives the message in which the VLAN ID in the Ethernet data frame is "n", the message in which the VLAN ID is "n+1", and the message in which the VLAN ID is "n+2"; the reception ECU C receives the message in which the VLAN ID in the Ethernet data frame is "n+1" and the message in which the VLAN ID is "n+2"; and the reception ECU D receives only the message in which the VLAN ID in the Ethernet data frame is "n+2".

Accordingly, when the messages are transmitted with a regular period from the transmission ECU A in such a manner as to repeat the VLAN IDs in the data frames into "n", "n+1", "n", and "n+2", the reception ECU B receives the message every reception period of 10 msec which is the same as the transmission period of the transmission ECU A.

Similarly, the reception ECU C receives the message every reception period of 20 msec, and the reception ECU D receives the message every reception period of 40 msec.

Figure 3:
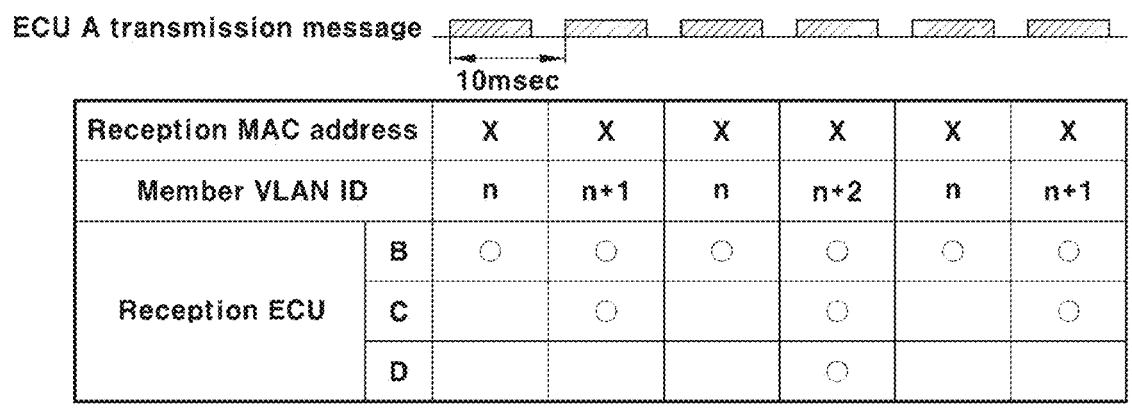
FIG. 3 is a diagram illustrating an electronic control unit receiving a message based on a multicast address and a virtual local area network ID (VLAN ID) within an Ethernet data frame in embodiments of the present invention.

FIG. 3 is a diagram illustrating an electronic control unit receiving a message based on a multicast address and a VLAN ID within an Ethernet data frame in embodiments of the present invention, and shows a condition when the transmission ECU A transmits the messages with a periodicity of 10 msec, the reception ECUs B, C, and D having the same multicast address ("reception MAC address") "X" receive the messages based on the VLAN ID ("member VLAN ID").

As shown in the figure, in the case where the transmission ECU A transmits the messages with the transmission period of 10 msec, when the multicast address is"X" and the VLAN ID is "n" in the Ethernet data frame of the message being transmitted, only the reception ECU B receives the message.

Further, when the multicast address is "X" and the VLAN ID is "n+1" in the Ethernet data frame of the message that the transmission ECU A transmits, only the reception ECUs B and C receive the message.

Further, when the multicast address is "X" and the VLAN ID is "n+2" in the Ethernet data frame of the message that the transmission ECU A transmits, all the reception ECUs B, C, and D receive the message.

Figure 4:
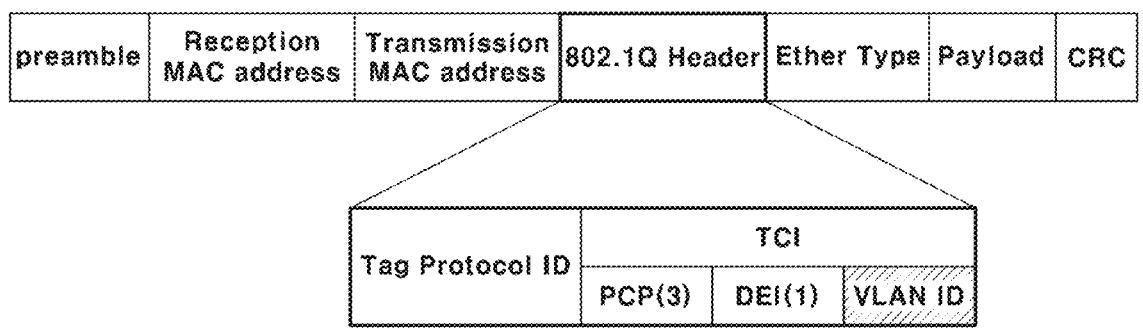
FIG. 4 is a diagram illustrating a format of an Ethernet data frame in embodiments of the present invention.

FIG. 4 is a diagram illustrating a format of an Ethernet data frame in embodiments of the present invention, and as shown in the figure, the Ethernet data frame includes a transmission MAC address and VLAN ID information.

In the meantime, as another embodiment of the present invention, when different reception groups are present with respect to one or multiple Ethernet messages, different multicast addresses are assigned to the respective reception groups, but the VLAN IDs may be set to be the same for each desired reception period regardless of the multicast addresses.

This is a method of changing the reception period of the message by distinguishing the multicast address.

Alternatively, when different reception groups are present with respect to one or multiple messages, different VLAN IDs are set for the respective reception groups and the respective desired reception periods and each VLAN uses a broadcast address.

This is a method of broadcasting by distinguishing groups of reception periods only with the VLAN IDs.

As described above, according to embodiments of the present invention, when with respect to the Ethernet messages having the unique transmission period for each ECU, the reception ECUs desire to receive the messages with different periods, in order to efficiently perform data reception and processing depending on the CPU performance for each ECU, the control processor sets the communication path in the Ethernet switch in such a manner that selective reception of the messages is possible with the reception period desired to be changed depending on the ECU.

Therefore, when transmission and reception of messages between Ethernet ECUs are performed without change in the period, a high-end CPU is used due to a large data processing load in transmission and reception ECUs as well as the control processor. However, in embodiments of the present invention, multicast and VLAN settings of the Ethernet switch and the operation of assigning the reception address for the transmission ECU are changed and improved, whereby without increase in the load of transmission and reception ECUs and the control processor, selective change of the message reception period for each reception ECU is possible.

In addition, during or after the vehicle development phase, when a period change request is further generated and the message reception period is required to be changed, taking an action is possible with a simple method where the Ethernet switch changes an ECU membership for each VLAN.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A communication method of an Ethernet network for a vehicle, the communication method comprising:
   setting, in an Ethernet switch, setting information for controlling a message reception period for each Ethernet electronic control unit (ECU);
   periodically transmitting, from a transmission ECU among the Ethernet ECUs connected to the Ethernet switch, a message to the Ethernet switch;
   determining, on the basis of the setting information and information included in the message, a reception ECU to which the message is transmitted, among the Ethernet ECUs connected to the Ethernet switch; and
   operating, by the Ethernet switch, to transmit the message transmitted from the transmission ECU, to the determined reception ECU,
   wherein each time the message is transmitted from the transmission ECU to the Ethernet switch, the message is transmitted by the Ethernet switch selectively only to the reception ECU determined on the basis of the setting information and the information included in the transmitted message, thereby controlling the message reception period for each reception ECU.

2. The communication method of claim 1, wherein the setting information comprises information that a multicast address and a VLAN ID are assigned and specified for each port of the Ethernet switch to which the Ethernet ECUs are connected, and
   wherein the information included in the message comprises, among the multicast addresses and the VLAN IDs for the respective ports, the multicast address and the VLAN ID to which the message is transmitted.

3. The communication method of claim 2, wherein in the setting information, a single or multiple VLAN IDs are assigned and specified for each port of the Ethernet switch.

4. The communication method of claim 3, wherein in the setting information, at least one VLAN ID assigned and specified to an arbitrary port is the same as the VLAN ID assigned and specified to another port.

5. The communication method of claim 2, wherein the transmission ECU transmits, to the Ethernet switch, the messages generated by setting the VLAN IDs in the information included in the respective messages in a predetermined order.

6. The communication method of claim 1, wherein the setting information comprises information that a multicast address and a VLAN ID are assigned and specified for each Ethernet ECU connected to the Ethernet switch, and
   wherein the information included in the message comprises, among the multicast addresses and the VLAN IDs for the respective Ethernet ECUs, the multicast address and the VLAN ID to which the message is transmitted.

7. The communication method of claim 6, wherein in the setting information, a single or multiple VLAN IDs are assigned and specified for each Ethernet ECU.

8. The communication method of claim 7, wherein in the setting information, at least one VLAN ID assigned and specified to an arbitrary Ethernet ECU is the same as the VLAN ID assigned and specified to another Ethernet ECU.

9. The communication method of claim 6, wherein the transmission ECU transmits, to the Ethernet switch, the messages generated by setting the VLAN IDs in the information included in the respective messages in a predetermined order.

10. The communication method of claim 1, wherein the messages are transmitted from the transmission ECU to the Ethernet switch with a regular period.

11. The communication method of claim 1, wherein the information included in the message comprises information included in a data frame of the message.

* * * * *